C. FREDRICKSON.
REVERSING MECHANISM FOR POWER DRIVEN MACHINES.
APPLICATION FILED MAY 16, 1911.

1,008,252.

Patented Nov. 7, 1911.

3 SHEETS—SHEET 1.

WITNESSES
Edw. Thorpe
E. S. Murdock

INVENTOR
Christian Fredrickson
BY
ATTORNEYS

C. FREDRICKSON.
REVERSING MECHANISM FOR POWER DRIVEN MACHINES.
APPLICATION FILED MAY 16, 1911.
1,008,252.
Patented Nov. 7, 1911.
3 SHEETS—SHEET 2.
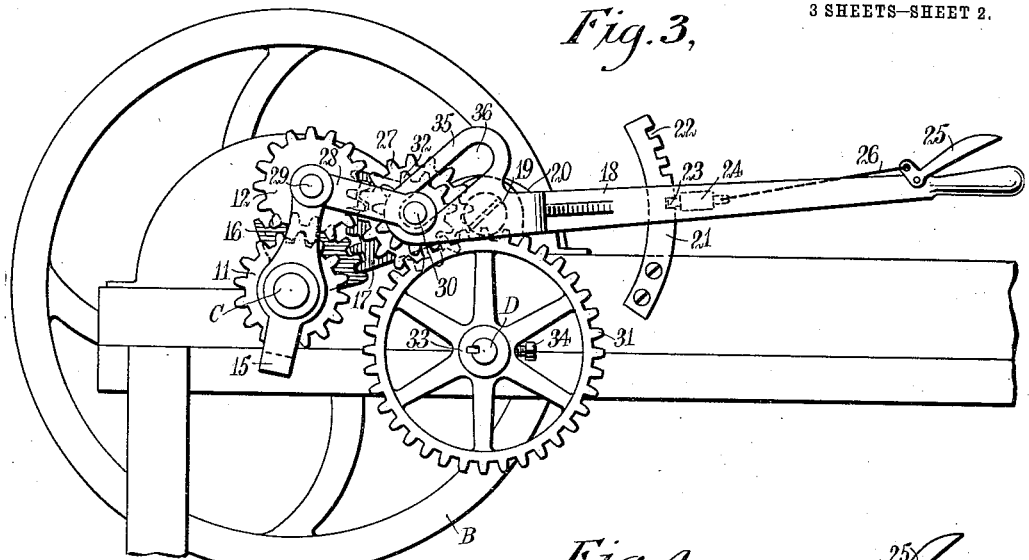
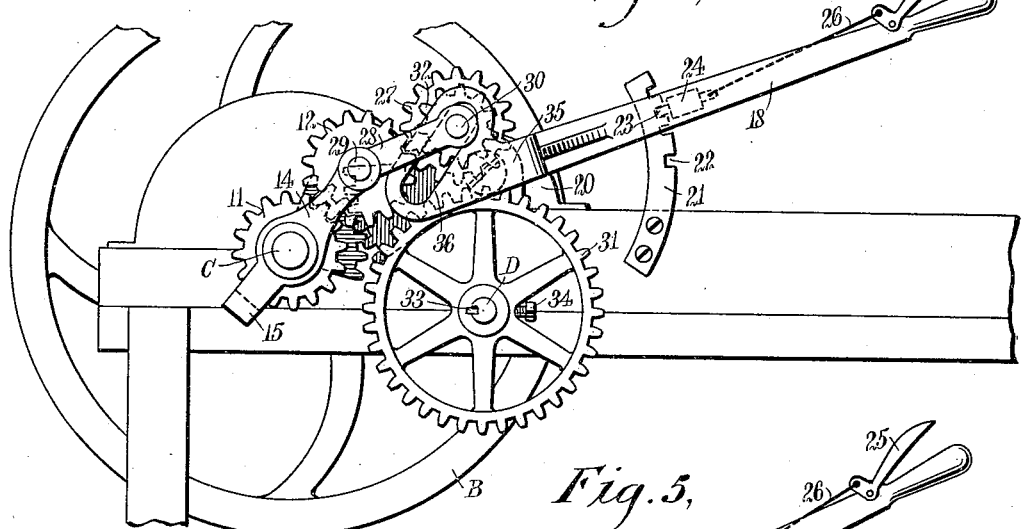
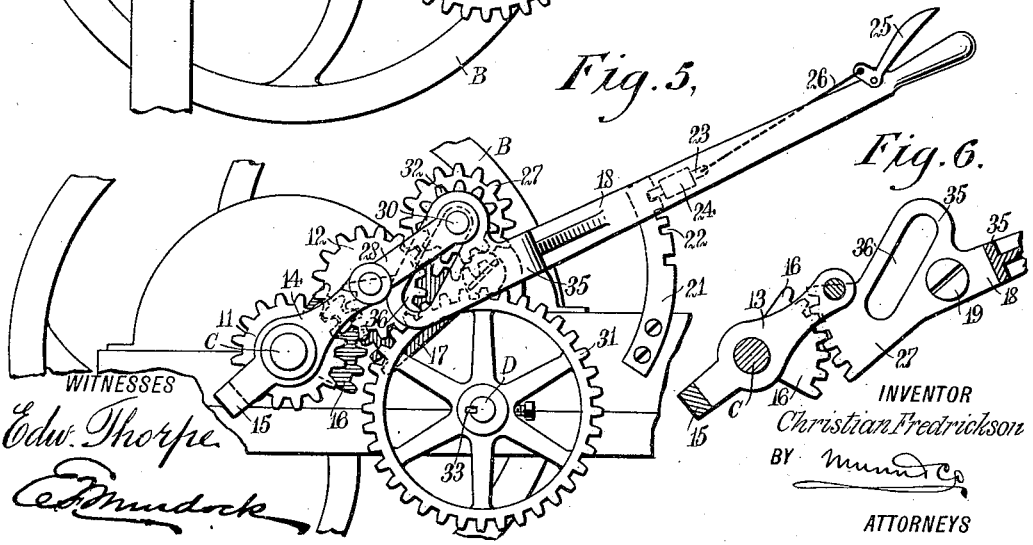
WITNESSES
Edw. Thorpe
C. S. Murdock
INVENTOR
Christian Fredrickson
BY Munn & Co
ATTORNEYS

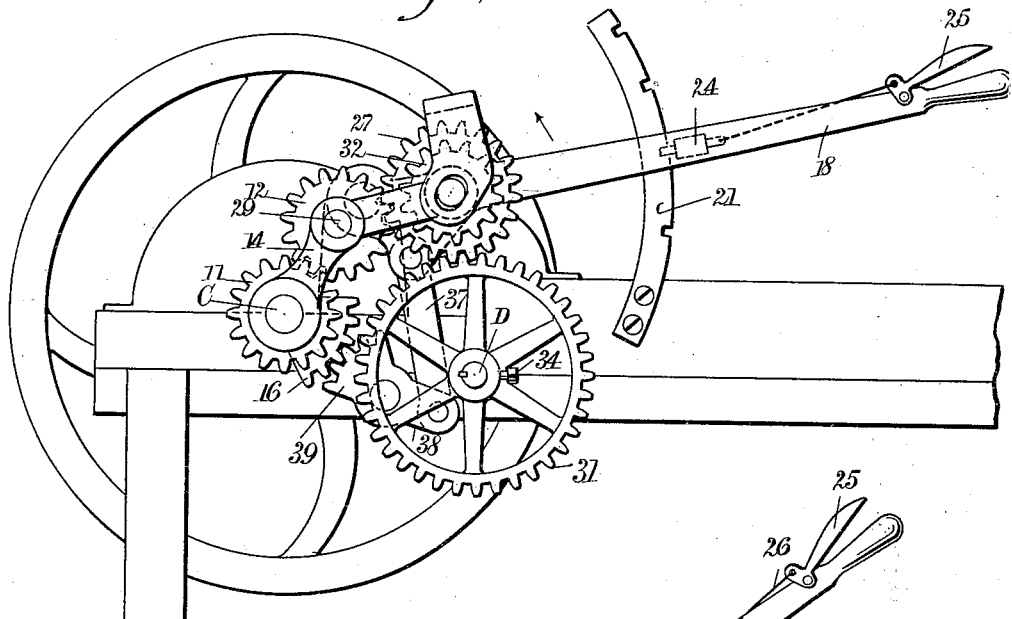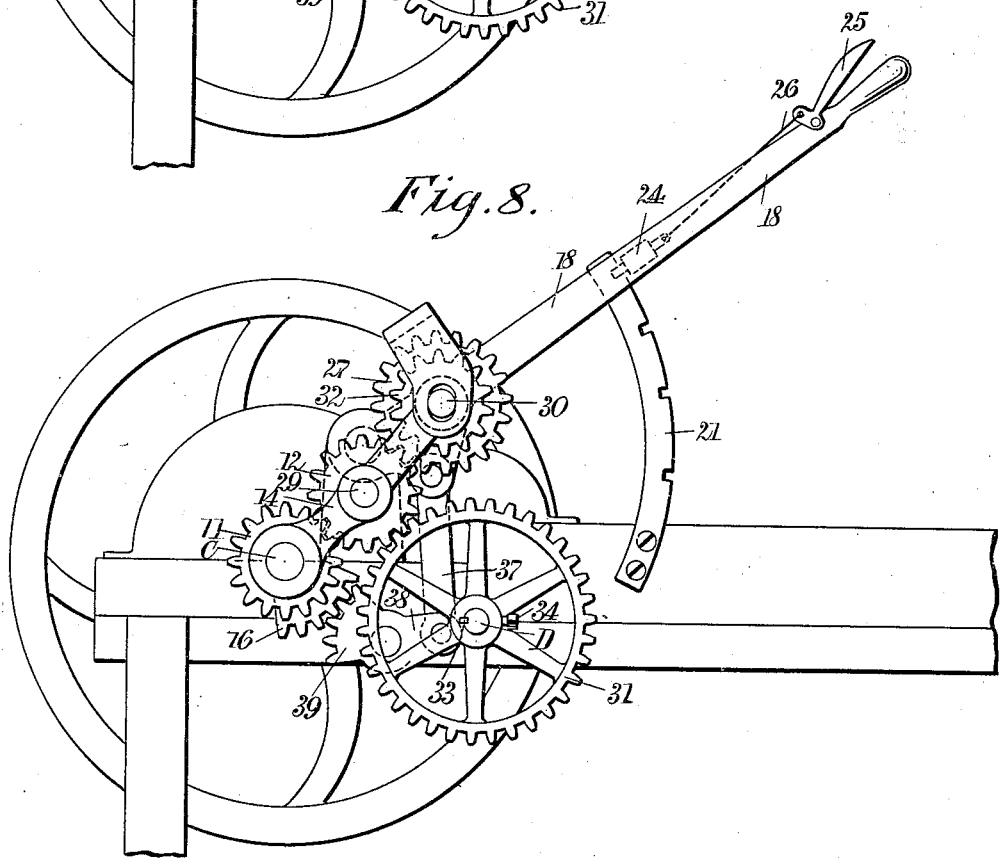

UNITED STATES PATENT OFFICE.

CHRISTIAN FREDRICKSON, OF RICE LAKE, WISCONSIN.

REVERSING MECHANISM FOR POWER-DRIVEN MACHINES.

1,008,252.  Specification of Letters Patent.  Patented Nov. 7, 1911.

Application filed May 16, 1911. Serial No. 627,548.

*To all whom it may concern:*

Be it known that I, CHRISTIAN FREDRICKSON, a citizen of the United States, and a resident of Rice Lake, in the county of Barron and State of Wisconsin, have invented a new and Improved Reversing Mechanism for Power-Driven Machines, of which the following is a full, clear, and exact description.

Among the principal objects which the present invention has in view are: to provide a simple, efficient and durable means for varying the speed in transmission from a driving to a driven shaft; and to provide a mechanism of the character set forth, simple and effective in operation.

One embodiment of the present invention is disclosed in the structure illustrated in the accompanying drawings, in which like characters of reference denote corresponding parts in all the views, and in which—

Figure 1:
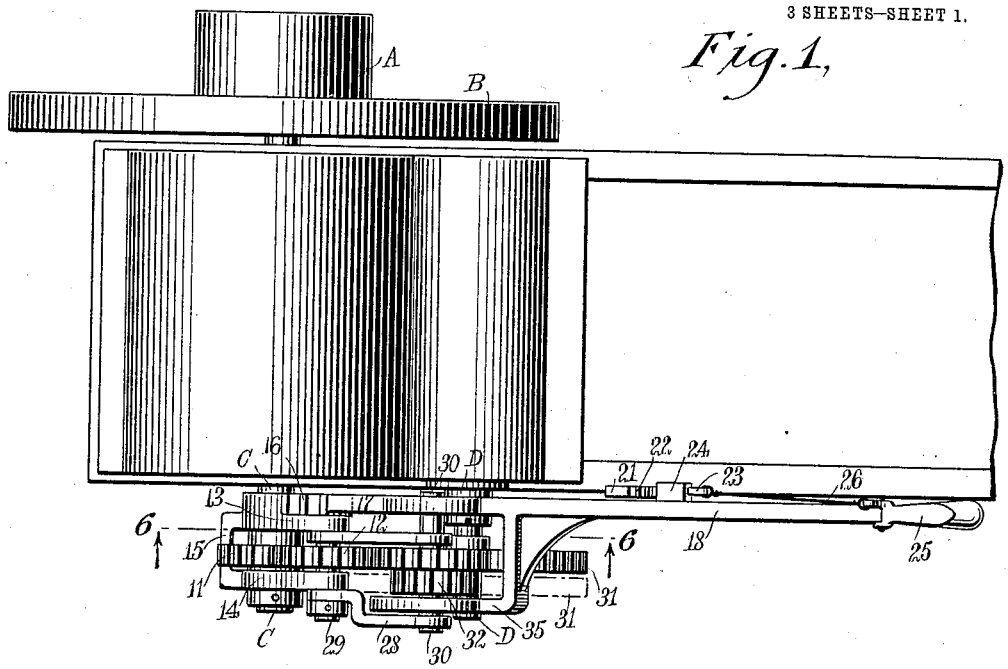
Figure 2:
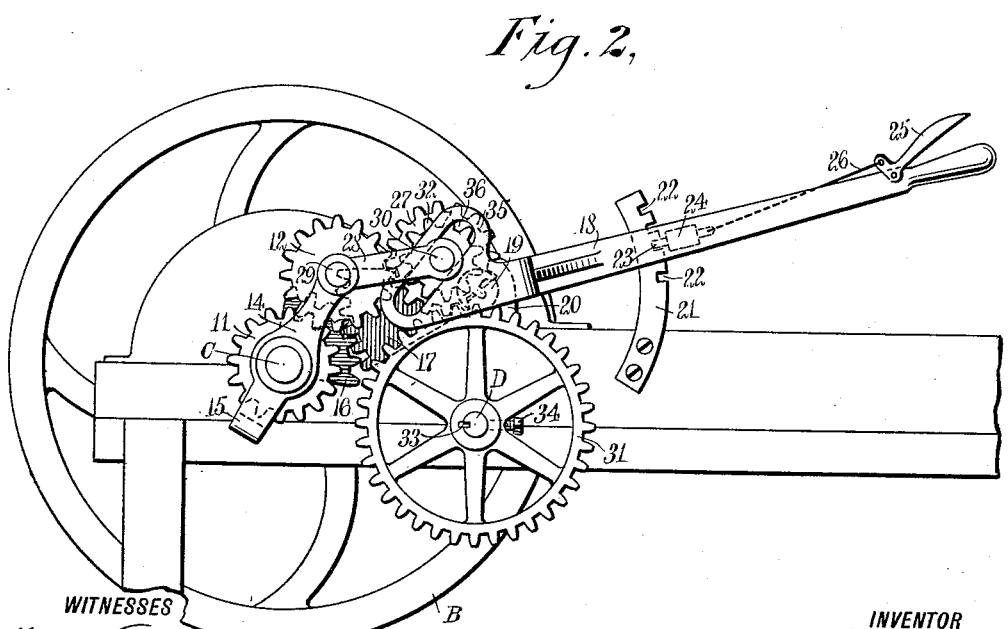

Figure 1 is a plan view of a power driven rotary feeding cutting machine, having applied thereto a reversing mechanism constructed and arranged in accordance with the present invention; Fig. 2 is a side elevation of the same, showing the transmission mechanism arranged for high speed transmission, wherein the driven shaft is rotated in a direction opposite that in which the driving shaft is rotated; Fig. 3 is a side elevation of the same, showing a transmission mechanism arranged for decreasing the speed of the driven shaft; Fig. 4 shows the disposition of the transmission mechanism when the driven shaft and driving shaft are disconnected; Fig. 5 shows the disposition of the transmission mechanism when the rotation of the driven shaft is reversed; Fig. 6 is a detail view, on an enlarged scale, showing the construction and arrangement of the lever connecting segments; and Figs. 7 and 8 are side views of a modified form of the invention, showing the two speed varying positions thereof.

The reversing mechanism herein described may be used in conjunction with any suitable machine. For the purpose of illustrating the application in its most simplified form a feed cutting machine is shown in conjunction with the reversing mechanism. The said machine is provided with a pulley A, a fly wheel B, a driving shaft C and a driven shaft D. The reversing mechanism to which the present invention relates is that shown in the drawings as intervening between the driving shaft C and the driven shaft D.

Fixedly mounted on the driving shaft C is a driving pinion 11. The pinion 11 is suitably held in position upon the shaft C, and is maintained in constant mesh with a swinging pinion 12 by means of crank arms 13 and 14. The crank arms 13 and 14 are connected by a yoke 15 which surrounds the pinion 11. The crank arms 13 and 14 are loosely mounted on the shaft C. The hub of the arm 13 is provided with a gear segment 16. The segment 16 is maintained in constant mesh with the teeth on a gear segment 17 formed at the lower or power end of the lever 18. The lever 18 is fulcrumed on a suitable trunnion 19 which is extended from a standard 20 on the frame of the machine. The lever 18 is held in adjusted position by a quadrant 21. The recesses 22, 22 hold the latch bolt 23 mounted in a guide box 24 on the lever 18. The latch bolt 23 is manually operated by means of a grip lever 25 and a connecting rod 26 therewith. The construction of the quadrant, latch bolt and grip lever are common to devices of this character.

When the lever 18 is manipulated to rock on the trunnions 19, the segment 16 is rotated about the shaft C, carrying therewith the arms 13 and 14 and the pinion 12. The pinion 12 is maintained in constant mesh with a pinion 27, to which it is connected by means of links 28, 28. The links 28, 28, connect the short shafts 29 and 30, and upon which the said pinions 12 and 27 are respectively fixed.

The pinion 27 is formed of any desired diameter, this problem being influenced by the speed which it is desired to transmit to the shaft D. The proportionate ratio between the pinion 27 and the pinion 11 regulates the speed of the shaft D when and as the pinion 27 is brought into mesh with the driven gear 31 mounted on the shaft D.

Fixedly attached to the pinion 27 is a slow speed pinion 32. The diameter of the pinion 32 is regulated in the same way, it being designed that the said pinion 32 shall be brought into meshed engagement with the pinion 31, thereby imparting a speed to the shaft D bearing a certain ratio to the rotation of the shaft C.

It is to accommodate the engagement with the two pinions 27 and 32 to vary the speed of revolution of the shaft D that I have mounted the pinion 31 upon the shaft D slidably, being non-rotatively held thereon by an elongated spline 33. It is to set the gear 31 in adjusted position that I have provided the set screw 34.

To support the shaft 30 and the pinions 27 and 32 carried thereby I have provided a bracket extension 35 set out from the lever 18 to form a yoke in conjunction with the main body of the said lever 18. In the extension 35 is formed an elongated slot 36. The length of the slot 36 is sufficient to permit the movement of the shaft 30 needed for the separation of the said shaft 30 from the shaft C.

The operation of the reversing mechanism is as follows:—Assuming the position to be as shown in Figs. 1 and 2 of the drawings, in which position the driven shaft D has therein produced the greatest number of revolutions per minute possible to the transmission mechanism, and that it is desired to change the rate of revolution of the driven shaft to the lower speed, such as shown in Fig. 3, the operation is to shift the lever 18 to the position shown in Fig. 4 of the drawings, wherein the latch bolt 23 is locked in the second from the top of the recesses 22. In thus raising the lever 18 it will be observed the power end of the lever carrying the segment 17 is relatively depressed. Working in unison with the segment 17, the segment 16 rotates to depress the arms 13 and 14, and pinion 12 and shaft 29 carried thereby, the depression of the shaft 29 compelling the links 28, 28 to extend toward the upper and rear end of the slot 36, thereby carrying the shaft 30 and the pinion 27 mounted thereon up the incline of the said slot 36 and out of engagement with the gear 31. In this position it will be observed that the gear 31 is disengaged from the transmission mechanism. It is in this position that the set screw 34 is loosened and the gear 31 manually shifted to the position shown in dotted lines in Fig. 1 of the drawings, and in which position the said gear 31 is in line with the small pinion 32. The lever 18 is then shifted to the position shown in Fig. 3 of the drawings, and wherein the latch bolt 23 is held in the lowermost of the recesses 22. In order to accomplish this the handhold end of the lever 18 has been depressed, lifting proportionately the power end of the said lever and segment 17 formed thereon. Lifting the segment 17 causes the segment 16 and arms 13 and 14 connected therewith to rock on the shaft C and lift the pinion 12 and shaft 29, as shown in Fig. 3. The shaft 29 being thus disposed, it draws the shaft 30 through the interposition of the links 28 to the end of the slot 36 and to the lowest position therein. This holds the pinion 32 in toothed engagement with the gear 31, and the machine is then in position to transmit from the shaft C to the shaft D a speed of rotation in the latter proportioned to the difference in diameter between the pinion 11 and the pinion 32, and between the pinion 32 and the gear wheel 31; both transmissions operating to reduce speed.

By the manipulation of the lever 18 as above described it is shown how the driven shaft D has varied in speed through the arrangement of the transmission mechanism. If it now be desired to reverse the rotation of the shaft D, this is accomplished in the following manner:

Whenever it is necessary to shift to or from engagement with the pinion 32, it is necessary to disengage the transmission mechanism from the gear 31, to do which it is necessary to place the lever 18 in the position shown in Fig. 4 of the drawings. While in this position the gear 31 is shifted on the shaft D to the position shown in full lines in Fig. 1 of the drawings, in which position it will be seen that the gear 31 is in line with the pinions 12 and 27. To reverse the rotary direction of the shaft D from that above described and imparted through the engagement with the pinions 27 and 32, the lever 18 is lifted to the position shown in Fig. 5 of the drawings, wherein the latch 23 is held in engagement with the top or first of the recesses 22. In lifting the handhold portion of the lever 18 the power end carrying the segment 17 is depressed. The operation through the segments 17 and 16, the arms 13 and 14, and the links 28, 28 is such as to lift the shaft 30 to the extreme upper end of the slot 36, and to force the pinion 12 into direct tooth engagement with the gear 31. The rotary direction imparted in transmission from the driving to the driven shaft through one gear is the reverse to that imparted through transmission through two gears. Thus the engagement by the pinion 12 with the gear 31 imparts to the said gear a rotation the reverse to that imparted by engagement with the pinions 27 and 32. It will thus be seen that the operation of the transmission mechanism to vary the speeds and to reverse the rotation of the driven shaft is exceedingly simple and easily managed.

In the modified form of the invention shown in Figs. 7 and 8 the lever 18 is directly connected by the link 37 to the arm 38 of a gear segment 39. The teeth of the segment 39 are meshed with the teeth of the segment 16. The modified construction is preferred in some instances because of its greater simplicity of construction.

Having thus described my invention, what I claim as new and desire to secure by Letters Patent is:—

1. A reversing mechanism for power driven machines, comprising a driving gear wheel fixedly mounted on the driving shaft; a driven gear wheel fixedly mounted on the driven shaft; bracket arms pivotally mounted on said driving shaft adjacent to said driving gear wheel; a gear segment fixedly connected with said bracket arms; a manually operated lever pivotally mounted on the frame of the machine having a gear segment meshed with the first mentioned segment; means for holding the said lever in adjusted position; a transmission gear wheel pivotally mounted upon said bracket arms and disposed in mesh with said driving gear wheel; a roving gear wheel mounted in sliding bearings and held in mesh with said transmission gear wheel; guides for said roving gear wheel; and link connections between said roving gear wheel and said transmission gear wheel arranged to maintain the said wheels in engagement.

2. A reversing mechanism for power driven machines, comprising a driving gear wheel fixedly mounted on the driving shaft; a driven gear wheel fixedly mounted on the driven shaft; bracket arms pivotally mounted on said driving shaft adjacent to said driving wheel; a gear segment fixedly connected with said bracket arms; a manually operated lever pivotally mounted on the frame of the machine having a gear segment meshed with the first mentioned segment; means for holding the said lever in adjusted position; a transmission gear wheel pivotally mounted upon said bracket arms in mesh with said driving wheel; a roving gear wheel mounted in sliding bearings and held in mesh with said transmission gear wheel; brackets integrally connected with and set out from said lever having slots for the bearings of said roving gear wheel to move the said roving gear wheel to and from said driven gear wheel; and link connections between said roving gear wheel and said transmission gear wheel arranged to maintain the said wheels in engagement.

3. A reversing mechanism for power driven machines, comprising a driving gear wheel fixedly mounted on the driving shaft; a driven gear wheel fixedly mounted on the driven shaft; bracket arms pivotally mounted on said driving shaft adjacent to said driving wheel; a toothed segment fixedly connected with said bracket arms; a manually operated lever pivotally mounted on the frame of the machine having a toothed segment at the end thereof meshed with the first mentioned segment; means for holding the said lever in adjusted position; a transmission gear wheel pivotally mounted upon said bracket arms and in mesh with said driving wheel; a roving gear wheel mounted in sliding bearings and held in mesh with said transmission gear wheel; guides for said roving gear wheel; link connections between said roving gear wheel and said transmission gear wheel; an auxiliary gear wheel rigidly connected with said roving gear wheel, said auxiliary gear wheel having a diameter different from the said roving gear wheel; and means for shifting the said driven gear wheel longitudinally on the driven shaft.

In testimony whereof I have signed this specification in the presence of two subscribing witnesses.

CHRISTIAN FREDRICKSON.

Witnesses:
J. H. WILZ,
A. G. BILODEAU.

---

Copies of this patent may be obtained for five cents each, by addressing the "Commissioner of Patents, Washington, D. C."